United States Patent [19]

Lippman et al.

[11] 3,935,297

[45] Jan. 27, 1976

[54] CARBO CHLORINATION OF $AlPO_4$

[75] Inventors: Alfred Lippman, Metairie; Charles Toth, New Orleans; Roger Frank Sebenik, Matairie, all of La.

[73] Assignee: Toth Aluminum Corporation, New Orleans, La.

[22] Filed: Dec. 19, 1973

[21] Appl. No.: 426,218

[52] U.S. Cl. ............... 423/304; 423/305; 423/318; 423/496; 423/625; 423/630
[51] Int. Cl.² .................. C01B 25/12; C01F 7/02
[58] Field of Search .......... 423/304, 305, 318, 496, 423/625, 630, 116, 495

[56] References Cited
UNITED STATES PATENTS

| | | | |
|---|---|---|---|
| 2,812,239 | 11/1957 | Porter | 423/305 |
| 2,903,338 | 9/1959 | Porter | 423/305 |
| 3,241,917 | 3/1966 | Lapple | 423/318 |
| 3,343,945 | 9/1967 | Biggar | 423/625 |

FOREIGN PATENTS OR APPLICATIONS

| 348,363 | 5/1931 | United Kingdom | 423/495 |
|---|---|---|---|

Primary Examiner—Oscar R. Vertiz
Assistant Examiner—Gregory A. Heller
Attorney, Agent, or Firm—Holman & Stern

[57] ABSTRACT

A process of carbo-chlorination of $AlPO_4$ wherein $AlPO_4$ or $AlPO_4$-containing material is introduced into a reactor along with chlorinating agents and a source of carbon. The reactor is heated to approximately 600° to 1200°C and forms aluminum chlorides, phosphorous oxides, phosphorous chlorides, phosphorous oxychlorides and carbon oxides. These reaction products are then separated into three fractions by condensation, the first fraction being $P_2O_5$, the second fraction being $AlCl_3$ and $AlCl_3.POCl_3$ and the third fraction being remaining gasses, namely $PCl_3$, $PCl_5$, $P_2O_3$, CO and $CO_2$. The second fraction is reacted in a further reactor to give $AlCl_3$ and $P_2O_3$ which are separated by distillation. The phosphorous chlorides from the third fraction are oxidized, along with the $P_2O_3$ of the second fraction, to form $P_2O_5$.

11 Claims, 4 Drawing Figures

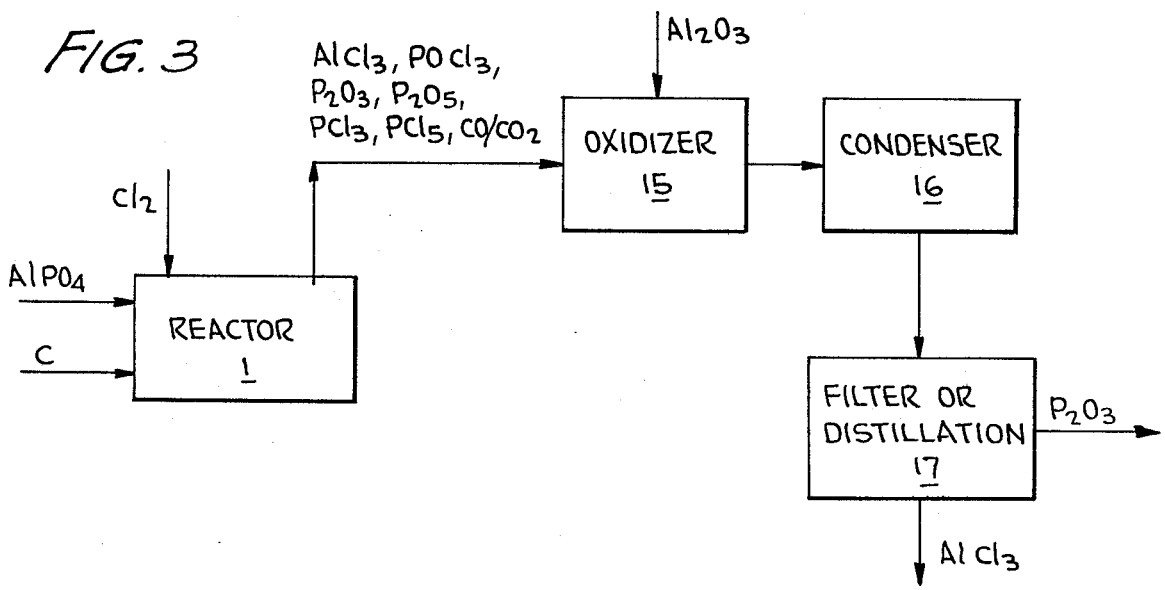
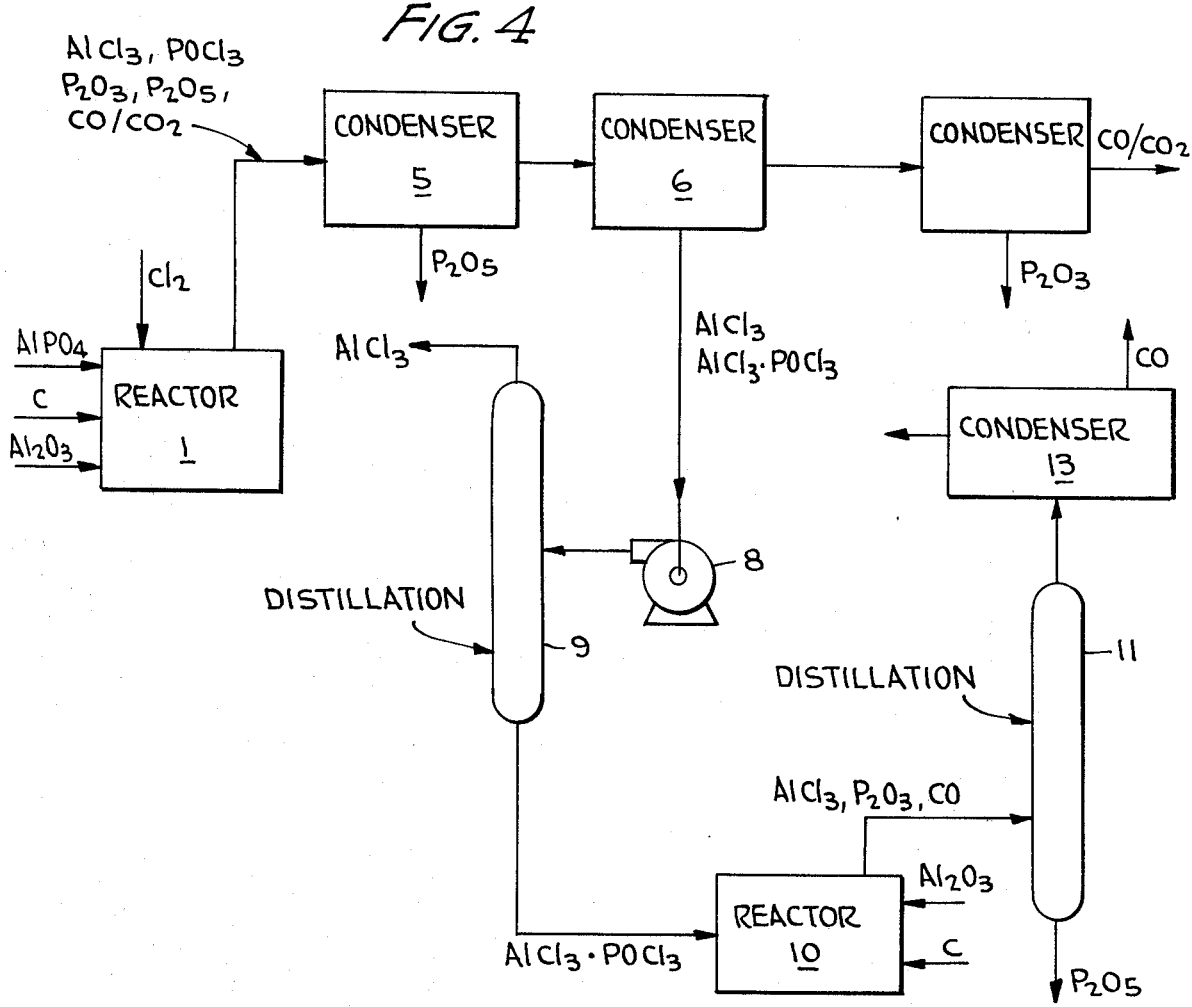

CARBO CHLORINATION OF ALPO$_4$

BACKGROUND OF THE INVENTION

Chloride metallurgy has become increasingly attractive in the manufacture of metals because of its versatility in effecting separation from ores, or from valuable metals whose chlorides are volatile. Because of the inherent simplicity of such treatment and the speed of the important reactions there result corresponding fundamental processing economics. Further, development of new construction materials have permitted development of equipment to economically handle the chlorine and metal chlorides. Thus, there recently have been announced two new processes for the making of aluminum metal through chloride metallurgy. The first is the Toth process, in which the aluminum chloride, formed by chlorination of clay or other aluminous materials, is reacted with manganese metal to form aluminum metal and manganese chloride. The other process is the Alcoa process where the aluminum chloride is electrolyzed after admixture with sodium chloride. In addition to these new processes, intensive effort is now being concentrated by the Japanese on a process to make nickel by chlorination of ores containing only fractional percentages of nickel.

In addition to recovery of major components of ores, chlorination has the further inherent advantage of easy recovery of minor but valuable components. As an example, aluminum or phosphate ores commonly contain a small but very valuable percentage of other constituents, including uranium. Costs of chlorination to recover uranium alone would be prohibitive, however, recovery of the uranium as a by-product would be very attractive. For these reasons the subject invention, which relates to chlorination of aluminum phosphate ores, is of a great deal of importance to the aluminum and phosphate industries. Through use of the instant invention the aluminum phosphate deposits of the Southeastern United States, those of Senegal, Africa, and similar world-wide deposits can be very advantageously utilized by this invention to make aluminum, phosphates, uranium and other valuable products. This process has a particular significance especially for the United States and those other countries which do not have indigenous bauxite deposits suitable for aluminum production through the conventional Bayer-Hall process and/or phosphate deposits suitable for fertilizer production by currently known processes. In the United States, for instance, there are no substantial domestic bauxite reserves suitable for conventional processing. Therefore, the domestic aluminum industry is virtually entirely dependent on imported bauxite for making aluminum, which is obviously an unhealthy situation relative to economic, industural and military security.

Through use of the subject inventive process, vast domestic reserves of aluminum phosphate may be utilized to economically provide two of the most essential commodities in national life, aluminum metal and phosphate fertilizer. In addition, minor but important by-products like uranium may be recovered. This is accomplished using ore which has theretofore been considered essentially valueless, and in addition, the ratio of aluminum to P$_2$O$_5$ in aluminum phosphate is fortuitously just about the same as is the ratio of the demand of aluminum metal to phosphate fertilizers in the United States, so this one process could advantageously supply both vital domestic needs.

SUMMARY OF THE INVENTION

The instant invention discloses the novel concept that aluminum chloride and phosphorous oxide can be produced by the carbo-chlorination of phosphate rock. The process consists of two basic steps. In the first step, aluminum phosphate ore is chlorinated to yield aluminum chloride, phosphorous chlorides and phosphorous oxychloride. In the second step, the phosphorous compounds are converted to phosphourous oxide in one of two ways: (1) The chlorination gases are passed through alumina and carbon at elevated temperatures to convert the phosphorous chloride compounds to phosphorous oxides, and the separation of phosphorous oxides from the aluminum chloride by known means such as fractional condensation. The alumina necessary for reaction with the phosphorous chlorides may be present as bauxite, pure alumina made by the Bayer or other processes, or alumina present in calcined clay. (2) The phosphorous chlorides in the chlorination gases are separated from AlCl$_3$ by fractional condensation or distillation and are then oxidized with air or oxygen to give the desired phosphorous oxides, and chlorine which is recycled.

BRIEF DESCRIPTION OF THE DRAWINGS

FIGS. 2–4 are schematic diagrams showing alternatives to the basic process.

DETAILED DESCRIPTION OF THE PREFERRED EMBODIMENTS

As noted above, the basic process comprises two primary steps, the first being the reaction of aluminum phosphate, chlorine, and carbon to give aluminum chloride, phosphorous oxides, phosphorous chlorides, phosphorous oxychlorides and carbon oxides; whereas, the second step comprises treatment of the above products to give aluminum chloride and phosphorous oxides. As can be seen from the following discussion, the first chlorination step is relatively straightforward, however, several alternatives are available for conducting the second step. The following discussion describes in detail a basic process; following this description alternative routes for the second major step are outlined.

Basic Process

Figure 1:
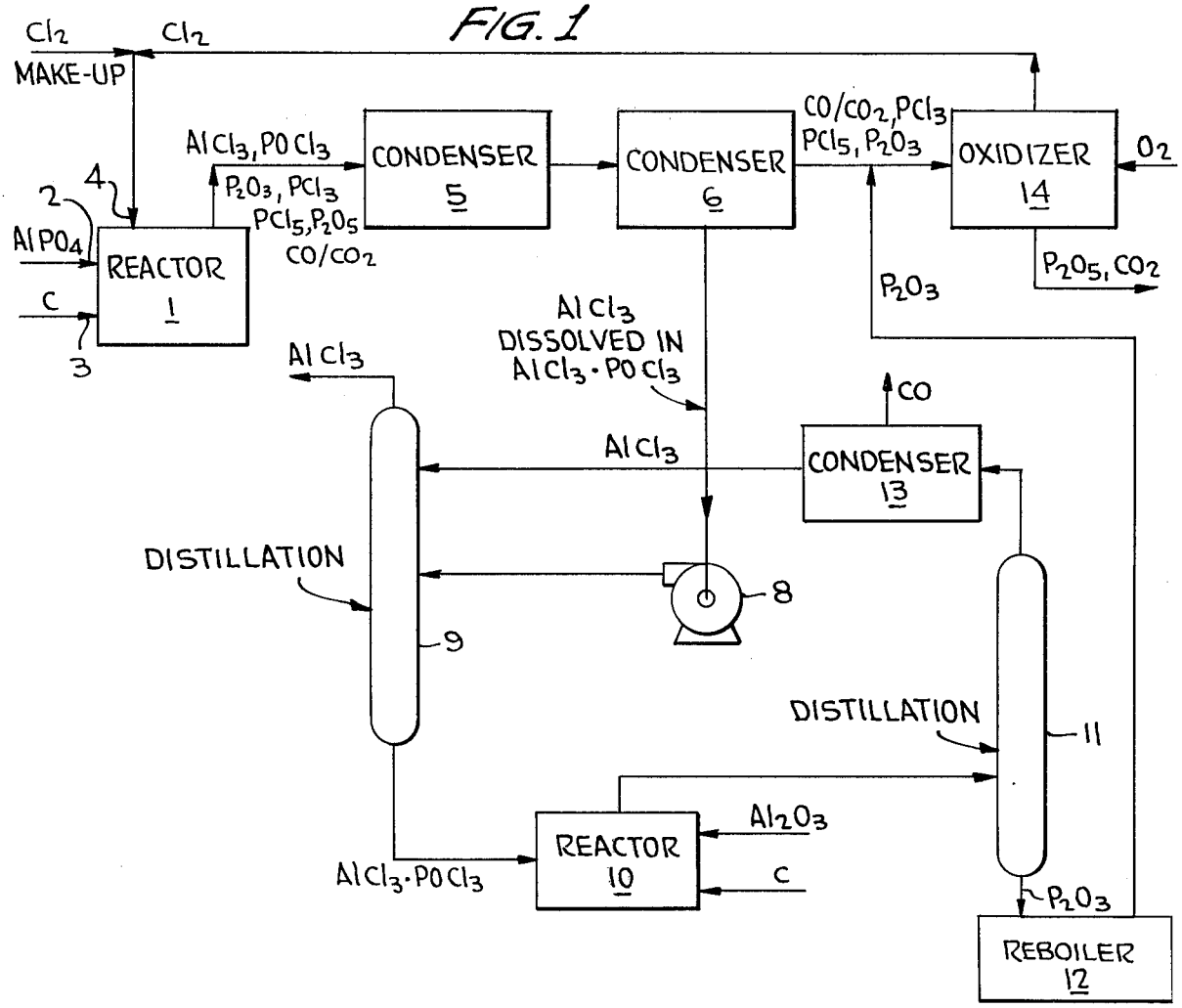
FIG. 1 is a schematic diagram which shows the main features of the basic process for carbo-chlorinization of aluminum phosphate to yield aluminum chloride and phosphorous oxide.

The basic process can best be understood by reference to FIG. 1, which is a schematic diagram of the overall basic process. The first step involves carbo-chlorination of aluminum phosphate, which is carried out in Reactor 1. The aluminum phosphate which is treated in this reactor is introduced at 2 and may exist as a constituent of conventional ores, either in essentially raw form or beneficiated by known means, or alternately chemically purified aluminum phosphate. The aluminum phosphate is anhydrous or in the case of ore, it is precalcined. The material containing such aluminum phosphate may exist as briquettes, granules, pebbles, or in other physical form, such choice depending largely on the type of reactor to be employed in conducting the carbo-chlorination. In addition to the aluminum phosphate containing material, a suitable reductant is also added to Reactor 1 at 3. Such reductants may be coal coke, charcoal, carbon produced by the coking of hydrocarbons, or other similar carbonaceous material. In addition to these two principal reactants, it may prove desirable to additionally incorporate a reaction promoter to enhance the speed or selectivity of the chlorination reactions. Such promoters include alkaline and alkaline earth chlorides, particularly sodium chloride. The aluminum phosphate, carbonaceous material, and reaction promoter, if any, may also be advantageously compressed or compacted together to give an extremely intimate mixture to further enhance the rate of chlorination.

These solid materials, after being charged to the reactor 1, are contacted with chlorine gas or carbon tetrachloride gas passed through inlet 4. The reaction temperature is above 600°C, and usually within the range of about 1000°–1200°C. In the chlorination reactor 1, the following series of overall reactions take place:

1) $3 Cl_2 + AlPO_4 + 4C \rightarrow PCl_3 + AlCl_3 + 4CO$
2) $3 Cl_2 + AlPO_4 + 3C \rightarrow POCl_3 + AlCl_3 + 3CO$
3) $4 Cl_2 + AlPO_4 + 4C \rightarrow PCl_5 + AlCl_3 + 4CO$
4) $3 Cl_2 + 2 AlPO_4 + 3C \rightarrow P_2O + 2 AlCl_3 + 3CO$
5) $3 Cl_2 + 2 AlPO_4 + 5C \rightarrow P_2O_3 + 2 AlCl_3 + 5 CO$ It is to be understood that in addition to these major overall reactions, certain side reactions may take place to give minor quantities of other components, but these are not important to the understanding of the overall features of the instant invention. It should be noted from Table 1 that these several chlorination reactions, as written, are thermodynamically highly favored, and have highly negative free energies of reactions. Since the reactions are endothermic, provision must be made to bring the reactants to reaction temperature and to supply the necessary heats of reaction.

Any of the conventional gas-solid contacting reactors may be employed to conduct the reaction, and such equipment is well known to those skilled in the art. For example, if particles below about 1/16th inch and finer are used, they could be conveniently processed in a fluidized bed reactor.

If this type of reactor is employed, the heat of reaction could be supplied by preheating the reactants in conventional heat exchange equipment, and by combustion within the reactor of excess carbon or other fuel, including carbon monoxide, introduced with the feed.

A rotary kiln or reactor also could be employed to establish contact between chlorine and the solid reagents previously indicated. In this type of reactor countercurrent flow of chlorine and solid feed could be used to best advantage. To prevent excessive pressure drops as the particles grow smaller, they could be removed when still of substantial size and increased in size in another vessel by aggregation, extrusion or other means, reintroduced and thus recycled. Aluminum phosphates should preferably be ground to substantially less than 200 mesh and coke ground in a similar manner could also then be compressed together with or without conventional binders such as starch, fuel oil, etc. After compression and granulation the particles could be ground to appropriate sizes for feeding the particular particle size to be used in accordance with the requirements of the particular type of reactor (chlorinator) employed.

In converting the chlorination products into only aluminum chloride and phosphorous oxide, the preferred process is given in FIG. 1, as noted previously. To facilitate an understanding of the process details, the boiling points and other physical and thermochemical data for reactants and products are shown in Table 2. Looking at condenser 5 in FIG. 1, which is optional, any $P_2O_5$ formed in chlorination reactor 1 is separated from the reaction mixture by cooling the mixture to about 500°C (m.p. of $P_2O_5$ is 569°C and b.p. is 591°C). Any conventional corrosion resistant apparatus for cooling such gases could be used to perform this service. One attractive possibility would be to inject inert gases into the reaction stream to effect the relatively small amount of cooling required for this condensation.

Aluminum chloride, and aluminum chloride-phosphorous oxychloride complexes ($AlCl_3 \cdot POCl_3$ and complexes of other stoichiometry) are next condensed out of the gas stream in a Condenser 6 by cooling below their respective boiling points, i.e., by cooling to about 90°–180°C ($AlCl_3$ b.p. = 181°C; $AlCl_3 \cdot POCl_3$ b.p. = 400°C, m.p. = 188°C). By-products would be collected in cyclones or filters on the walls of the heat exchanger. This condensed fraction would consist of $AlCl_3$ dissolved in liquid $AlCl_3 \cdot POCl_3$ complex or alternatively, if desired $AlCl_3$ and $POCl_3$ could be condensed in solid form with subsequent melting under pressure at about 200°C. The liquid $AlCl_3$ dissolved in $AlCl_3 \cdot POCl_3$ is pumped by pump 8 to increase the pressure to about 4 atmospheres to a distillation column 9 where the $AlCl_3$ is taken off as distillate and condensed as a liquid. $AlCl_3$ sublimes at atmospheric pressure. It must be pressurized to 4 atmospheres before liquefication is possible. Consequently distillation must be conducted at this elevated pressure.

TABLE 1

FREE ENERGIES OF REACTIONS

| | | ΔF, kcal/mole (per mole of Cl or chloride) | | |
|---|---|---|---|---|
| | Chlorination Reactions | 1000 K | 1200 K | 1500 K |
| 1) | $3 Cl_2 + AlPO_4 + 4C \rightarrow PCl_3 + AlCl_3 + 4CO$ | −18.21 | −26.78 | −39.57 |
| 2) | $3 Cl_2 + AlPO_4 + 3C \rightarrow POCl_3 + AlCl_3 + 3CO$ | −16.74 | −22.75 | −31.43 |
| 3) | $4 Cl_2 + AlPO_4 + 4C \rightarrow PCl_5 + AlCl_3 + 4CO$ | − 8.03 | −12.59 | −19.40 |
| 4) | $3 Cl_2 + 2 AlPO_4 + 3C \rightarrow P_2O_5 + 2 AlCl_3 + 3CO$ | − 4.80 | −10.83 | −20.20 |
| 5) | $3 Cl_2 + 2 AlPO_4 + 5C \rightarrow P_2O_3 + 2AlCl_3 + 5 CO$ | −23.55 | − 35.12 | −52.39 |
| | Oxidation Reactions | | | |
| 8) | $6 PCl_5 + 5 Al_2O_3 \rightarrow 10 AlCl_3 + 3 P_2O_5$ | −39.56 | −48.48 | −61.30 |
| 9) | $2 PCl_3 + Al_2O_3 \rightarrow 2 AlCl_3 + P_2O_3$ | −19.13 | −21.59 | −25.11 |
| 10) | $6 PCl_3 + 5 Al_2O_3 + 6 Cl_2 \rightarrow 10 AlCl_3 + 3 P_2O_5$ | −17.03 | −18.42 | −20.30 |
| 11) | $2 POCl_3 + Al_2O_3 \rightarrow 2 AlCl_3 + P_2O_5$ | + 4.52 | + 2.13 | − 1.32 |

TABLE 2

PHYSICAL AND THERMOCHEMICAL DATA

| Compound | m.p. °C | b.p. °C | 800° °K | 1000° °K | 1100° °K | 1200° °K | 1300° °K | 1400° °K | 1500° °K |
|---|---|---|---|---|---|---|---|---|---|
| | | | | | ΔG°$_f$ (kcal/mole) | | | | |
| AlPO$_4$ | 1500 | | | −319.77 | −310.73 | −301.76 | −202.69 | −283.71 | −274.7 |
| P$_4$O$_{10}$ | 569 | 591 | −561.452 | −512.295 | −487.938 | −463.71 | −439.60 | −415.61 | −391.72 |
| POCl$_3$ | 2 | 105.3 | −109.300 | −99.222 | −94.23 | −89.264 | −84.302 | −79.403 | −74.50 |
| PCl$_3$ | −91 | 75.5 | −61.350 | −55.395 | −52.444 | −49.509 | −46.588 | −43.679 | −40.78 |
| P$_4$O$_6$ | 22 | 173 | −464.067 | −431.61 | −415.54 | −399.56 | −383.66 | −367.84 | −352.10 |
| PCl$_5$ | 166.8 | 162. | −46.499 | −32.909 | −26.183 | −19.498 | −12.848 | +6.233 | +0.35 |
| CO | | −191 | −43.612 | −47.859 | −49.962 | −52.049 | −54.126 | −56.189 | +58.24 |
| AlCl$_3$ | 190 | 181 | −130.225 | −127.534 | −125.981 | −124.416 | −122.838 | −121.248 | −119.64 |
| γ—Al$_2$O$_3$ | 2000 | | −336.697 | −321.853 | −314.122 | −306.423 | −209.756 | −291.123 | −283.52 |

The resultant liquid AlCl$_3$ · POCl$_3$ is mixed in reactor 10. The liquid so condensed with carbon and alumina in the form of Bayer alumina, calcined bauxite, or calcined clay and reacted at about 400°–800°C to give aluminum chloride and phosphorous trioxide (P$_2$O$_3$), according to the following overall reaction:

6) Al$_2$O$_3$ + 2C + 2AlCl$_3$ · POCl$_3$ → 4AlCl$_3$+P$_2$O$_3$+2CO

The AlCl$_3$ and P$_2$O$_3$ can be separated from each other in distillation column 11 and rectification reboiler 12 operating at about 232°C, and the phosphorous trioxide is the oxidized to salable P$_2$O$_5$.

The aluminum chloride from the top of distillation column 11 is returned as reflux to distillation column 9 after passing through condenser 13 operating at about 216°C where it is recovered as pure product. P$_2$O$_3$ produced in distillation column 11 passes through a reboiler 12 and is joined with the phosphorous oxides, carbon oxides and chlorides leaving condenser 6 and passed to oxidizer 14 operating at about 200°–500°C wherein an oxithermic reaction is carried out to give carbon dioxide, and solid P$_2$O$_5$ on one hand and chlorine which is returned to the chlorination reaction 1.

Alternatives

Figure 2:
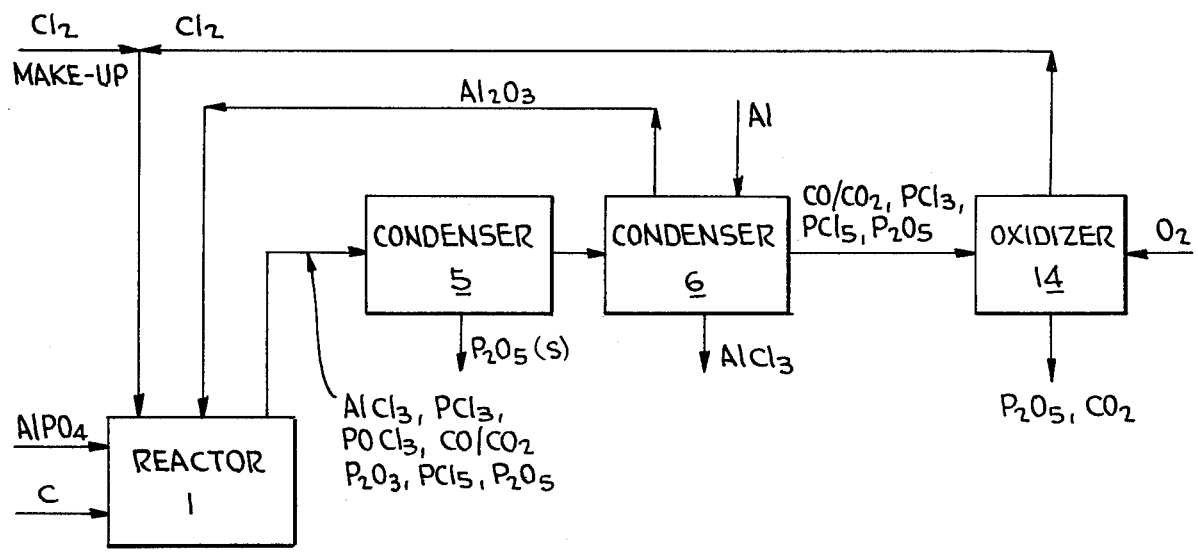

Depending on the composition of the raw materials and conditions of chlorination, certain alternative steps to the basic process might be found desirable. For instance, looking at FIG. 2, if the amount of POCl$_3$ associated with the aluminum chloride leaving the chlorinator reactor 1 is very small it would be advantageous to simply add a small amount of aluminum metal to the liquid condensate (AlCl$_3$ and AlCl$_3$ · POCl$_3$) at condenser 6. The aluminum metal would reduce POCl$_3$ to PCl$_3$ by the following reaction:

7) 3POCl$_3$ + 2Al → Al$_2$O$_3$ + 3 PCl$_3$

The alumina would be returned to the chlorination reactor 1 for chlorination while the phosphorous chloride would go directly to oxidizer 14. This would eliminate the need for reactor 10 as well as distillation columns 9 and 11 and the associated equipment.

Another alternate process as seen in FIG. 3 would be to directly oxidize in oxidizer 15 all phosphorous chlorides and oxychlorides leaving the chlorinator reactor 1 to phosphorous trioxide using activated Bayer alumina. The reaction would be a solid-gas reaction at above 1100°C, conducted in similar apparatus as the chlorination reactor 1. The products upon quenching in condenser 16 will form a slurry of solid AlCl$_3$ in liquid phosphorous trixode because there is little mutual solubility. They would be readily separated by filtration or by distillation means 17.

Still a further alternate process as seen in FIG. 4 is the addition of alumina directly to the chlorination reactor 1 which would oxidize the product phosphorous chlorides in situ. The phosphorous oxychloride which would not oxidize at a chlorinator temperature below 1100°C, could be separated downstream by condensing as an AlCl$_3$ · POCl$_3$ complex. This condensation would be performed in the same manner as condenser 6 in FIG. 1 of the basic process.

EXAMPLE 1

Small scale experiments have been conducted very simply in a silica boat which was placed in a 2cm diameter tube furnace. The solids charged to the boat were thouroughly mixed AlPO$_4$ and calcined charcoal. Chlorine gas was passed over the boat at a rate of about 2–3 liters/min. One representative experiment had a solids charge of 0.92 gms of AlPO$_4$ and 0.46 gm of carbon at a temperature of 900°C. After two hours the AlPO$_4$ was completely chlorinated leaving only a residue of 0.14 gms of carbon.

In another experiment 0.72 gms of AlPO$_4$ and 0.28 gms of carbon in a silica boat at 750°C reached 73 percent conversion in four hours with a 2-3 liter/min. chlorine rate.

EXAMPLE 2

Experiments to demonstrate the reactions of the phosphorous chlorides and oxychlorides with Al$_2$O$_3$ are best conducted in a double reactor such that an AlPO$_4$ and Al$_2$O$_3$ reactor bed are operated in series. This is easily accomplished experimentally by placing a plug of porous glass wool between the two packed reactor beds of AlPO$_4$ and Al$_2$O$_3$ in the same ceramic tube. Alternately two interconnected ceramic tubes each containing a reaction bed of AlPO$_4$ plus C and Al$_2$O$_3$, respectively, can be used. The AlPO$_4$ bed operating at 800°C and the Al$_2$O$_3$ bed operating at 1100°C with a Cl$_2$ flow rate of 20 cc/min. yields a complete conversion of the AlPO$_4$ to AlCl$_3$ and phosphorous oxide in less than one hour.

EXAMPLE 3

Literature teaches that AlCl$_3$ and POCl$_3$ form a complex AlCl$_3$·POCl$_3$. Consequently, AlCl$_3$ and POCl$_3$ are not readily separated by physical means such as distillation. One convenient method to make the separation is to react the AlCl$_3$ and POCl$_3$ complex with Al$_2$O$_3$ and coke solids. Thus, for example, an experiment in a 3-inch diameter stirred autoclave reactor containing 400 grams of AlCl$_3$ · POCl$_3$ plus 10 grams of coke (or carbon) and 20 grams of Al$_2$O$_3$ (325 mesh Bayer alumina) yielded 370 grams of AlCl$_3$ and 75 grams of P$_2$O$_3$.

We claim:

1. A process of anhydrous carbo-chlorination of AlPO$_4$ comprising the steps of introducing AlPO$_4$-containing material into a reactor zone; introducing chlorine and carbonaceous material into said reactor zone; heating the reactor zone to a temperature of from 600°–1200°C to form aluminum chlorides, phosphorous oxides, phosphorous chlorides, phosphorous oxychlorides and carbon oxides; separating the reaction products into three fractions by condensation, the first fraction being $P_2O_5$, the second fraction being $AlCl_3$ and $AlCl_3 \cdot POCl_3$, and the third fraction being $PCl_3$, $PCl_5$, $P_2O_3$, CO and $CO_2$; and passing said fraction, which is gaseous, into an oxidizer to produce $P_2O_5$, $CO_2$ and $Cl_2$.

2. The process of claim 1 wherein said first fraction is separated in a first condenser operated at about 500°C, said second fraction is separated in a condenser operated at a temperature of from 90°–180°C, and said third fraction being the remaining gases from the condenser for the second fraction.

3. The process of claim 1 comprising the further steps of separating the $AlCl_3$ from the $AlCl_3 \cdot POCl_3$ of the second fraction by distillation; reacting said $AlCl_3 \cdot POCl_3$ with $Al_2O_3$ and C to give $AlCl_3$, $P_2O_3$ and CO in a second reaction zone; separating said $AlCl_3$ from $P_2O_3$ by condensation; and oxidizing said $P_2O_3$ in an oxidizer to form $P_2O_5$.

4. The process of claim 1 wherein said second reaction zone operates at a temperature of from 400°–800°C and said oxidizer operates at from 200°–500°C.

5. The process of claim 1 wherein said oxidizer is operating at from 200°–500°C to produce the $P_2O_5$, $CO_2$ and $Cl_2$; and recycling said $Cl_2$ into the first reactor zone.

6. The process as claimed in claim 1 wherein said first and second fraction are separated from said third fraction in the same condenser.

7. A process of anhydrous carbo-chlorination of $AlPO_4$ comprising the steps of introducing chlorine and carbonaceous material into said reactor zone; heating the reactor zone to a temperature of from 600°–1200°C to form aluminum chlorides, phosphorous oxides, phosphorous chlorides, phosphorous oxychlorides and carbon oxides; separating the reaction products into three fractions by condensation, the first fraction being $P_2O_5$ which is separated in a first condenser, the second fraction being $Al_2O_3$ which is separated in a second condenser by introducing aluminum metal into said second condenser during its operation which reduces the phosphorus oxychloride to $Al_2O_3$ and $PCl_3$, and recycling said $Al_2O_3$ back to said reaction zone, and the third fraction being $PCl_3$, $PCl_5$, $P_2O_3$, CO and $CO_2$ which are the remaining gases from said second condenser.

8. A process of anhydrous carbo-chlorination of $AlPO_4$ comprising the steps of introducing $AlPO_4$-containing material into a reactor zone; introducing chloride and carbonaceous material into said reactor zone; heating the reactor zone to a temperature of from 600°–1200°C to form aluminum chlorides, phosphorous oxides, phosphorous chlorides, phosphorous oxychlorides and carbon oxides; passing the reaction products to an oxidizer; introducing $Al_2O_3$ into said oxidizer to form $AlCl_3$ and $P_2O_3$; passing said $AlCl_3$ and $P_2O_3$ to a condenser to form a slurry of solid $AlCl_3$ in liquid $P_2O_3$; and separating by filtration or distillation.

9. The process as claimed in claim 8 wherein said oxidizer is operated in a temperature range of from 1100°–1300°C.

10. The process as claimed in claim 1 comprising the further step of introducing $Al_2O_3$ into said reaction zone to thereby oxidize the phosphorous chlorides in situ and remove them as a reaction product.

11. The process as claimed in claim 1 comprising the further step of introducing a reaction promoter into said reaction zone, which promoter is selected from the group consisting of alkaline chlorides or alkaline earth chlorides.

* * * * *